(12) United States Patent
Fang et al.

(10) Patent No.: US 12,078,201 B2
(45) Date of Patent: Sep. 3, 2024

(54) BOARD STRUCTURE HAVING ARTICULATED JOINTS AND SPLICE OBJECT HAVING THE SAME

(71) Applicant: NATIONAL TAIWAN UNIVERSITY, Taipei (TW)

(72) Inventors: Chiao Fang, Taoyuan (TW); Vivian Hsin-Yueh Chan, Taipei (TW); Lung-Pan Cheng, Taichung (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 18/209,023

(22) Filed: Jun. 13, 2023

(65) Prior Publication Data

US 2023/0400054 A1 Dec. 14, 2023

Related U.S. Application Data

(60) Provisional application No. 63/352,202, filed on Jun. 14, 2022.

(51) Int. Cl.
| | |
|---|---|
| *F16M 11/00* | (2006.01) |
| *F16C 11/04* | (2006.01) |
| *F16M 11/38* | (2006.01) |
| *F16M 13/02* | (2006.01) |

(52) U.S. Cl.
CPC .............. *F16C 11/04* (2013.01); *F16M 11/38* (2013.01); *F16M 13/02* (2013.01)

(58) Field of Classification Search
CPC ......... F16C 11/04; F16M 11/38; F16M 13/02; F16M 11/041; F16B 5/008
See application file for complete search history.

(56) References Cited

U.S. PATENT DOCUMENTS

| | | | | |
|---|---|---|---|---|
| 5,722,628 A | * | 3/1998 | Menaged | A47B 23/043 248/455 |
| 7,988,112 B2 | * | 8/2011 | Tang | F16M 11/08 248/248 |
| 11,453,193 B2 | * | 9/2022 | Cosgrove | G09F 9/301 |
| 12,001,247 B2 | * | 6/2024 | Hsu | G06F 1/1652 |

(Continued)

FOREIGN PATENT DOCUMENTS

| | | |
|---|---|---|
| CN | 2572097 Y | 9/2003 |
| CN | 214465340 U | 10/2021 |

(Continued)

*Primary Examiner* — Amy J. Sterling
(74) *Attorney, Agent, or Firm* — Li & Cai Intellectual Property (USA) Office

(57) ABSTRACT

A board structure having articulated joints and a splice object having articulated joints are provided. The board structure includes a first board and a second board. The first board has a first holding slot and a first articulated arm, and the second board has a second holding slot and a second articulated arm. The first articulated arm is L-shaped or T-shaped and is accommodated in the second holding slot. The second articulated arm is L-shaped or T-shaped and is accommodated in the first holding slot. An articulated seam is formed between the first board and the second board, and the first board and the second board are positioned at various angles relative to each other along the articulated seam. The splice object includes multiple ones of the first boards and second boards.

10 Claims, 14 Drawing Sheets

(56) References Cited

U.S. PATENT DOCUMENTS

| | | | | |
|---|---|---|---|---|
| 2008/0216435 A1* | 9/2008 | Nolan | ................... | E04F 15/02 |
| | | | | 52/588.1 |
| 2012/0216472 A1* | 8/2012 | Martensson | .......... | E04B 1/6129 |
| | | | | 52/302.1 |
| 2013/0216740 A1* | 8/2013 | Russell-Clarke | ...... | B21D 31/04 |
| | | | | 219/121.72 |
| 2016/0085271 A1* | 3/2016 | Morrison | ................. | E05D 3/02 |
| | | | | 361/679.27 |
| 2019/0119862 A1* | 4/2019 | Penland, Jr. | ............. | E01C 5/18 |
| 2020/0222793 A1* | 7/2020 | Garofalo | ............... | A63F 13/214 |
| 2022/0365567 A1* | 11/2022 | Adury | .................. | G06F 1/1679 |
| 2023/0292455 A1* | 9/2023 | Caplow-Munro | ... | H05K 5/0017 |
| 2023/0383786 A1* | 11/2023 | Ren | .......................... | E05D 3/16 |

FOREIGN PATENT DOCUMENTS

| | | |
|---|---|---|
| CN | 113931906 A | 1/2022 |
| JP | 63235709 A | 9/1988 |

\* cited by examiner

BOARD STRUCTURE HAVING ARTICULATED JOINTS AND SPLICE OBJECT HAVING THE SAME

CROSS-REFERENCE TO RELATED PATENT APPLICATION

This application claims the benefit of priority to the U.S. Provisional Patent Application Ser. No. 63/352,202, filed on Jun. 14, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a board structure having articulated joints and a splice object having the same, and more particularly to a splice object having the board structures that are interconnected by having articulated joints and can be bent at specific angles, and the articulated joints are used to form a three-dimensional splice object.

BACKGROUND OF THE DISCLOSURE

Conventionally, for two boards to be connected and fixed at a specific angle, additional hinge elements are usually needed for connecting the two boards. However, the hinge elements not only incur additional cost but also take up time for connecting to the boards. In addition, the hinge elements also add extra weight.

Therefore, how to improve the connection effect of a board structure and to overcome the above-mentioned defects by improving the structural design has become an important issue to be addressed in this field of technology.

SUMMARY OF THE DISCLOSURE

In response to the above-referenced technical inadequacies, the present disclosure provides a board structure having articulated joints. Additional hinge elements are not needed between two boards for forming the articulated joint that allows the two boards to be bent and positioned at various angles.

In one aspect, the present disclosure provides a board structure having articulated joints. The board structure having articulated joints includes a first board and a second board. The first board has a first adjacent edge, a first holding slot, and a first articulated arm. The first articulated arm protrudes outward from a part of the first adjacent edge, and the first holding slot is adjacent to the first articulated arm and is recessed inward from the first adjacent edge. The first articulated arm has a first longitudinal part, and a first transverse part protrudes from one lateral side of an end portion of the first longitudinal part. The second board has a second adjacent edge, a second holding slot, and a second articulated arm. The second articulated arm protrudes outward from a part of the second adjacent edge, and the second holding slot is adjacent to the second articulated arm and is recessed inward from the second adjacent edge. The second articulated arm has a second longitudinal part, and a second transverse part protrudes from one lateral side of an end portion of the second longitudinal part. The first adjacent edge faces the second adjacent edge to define an articulated seam, the first articulated arm is accommodated in the second holding slot, and the second articulated arm is accommodated in the first holding slot. The first board and the second board are able to be positioned at various angles relative to each other along the articulated seam, the first transverse part abuts against an inner wall surface of the second holding slot, and the second transverse part abuts against an inner wall surface of the first holding slot.

In another aspect, the present disclosure provides a board structure having articulated joints. The board structure having articulated joints includes a first board and a second board. The first board has a first adjacent edge and a first holding slot. The first holding slot is recessed inward from the first adjacent edge. The second board has a second adjacent edge and an articulated arm. The articulated arm protrudes outward from a part of the second adjacent edge, the articulated arm has a longitudinal part, and a transverse part protrudes from one lateral side of an end portion of the longitudinal part. The first adjacent edge faces the second adjacent edge to define an articulated seam, and the articulated arm is accommodated in the first holding slot. The first board and the second board are able to be positioned at various angles relative to each other along the articulated seam, and the transverse part abuts against an inner wall surface of the first holding slot.

Furthermore, in response to the above-referenced technical inadequacies, the present disclosure provides a splice object having articulated joints. Additional hinge elements are not needed between a plurality of boards for forming the articulated joint that allows the plurality of boards to be spliced to form various objects.

In yet another aspect, the present disclosure provides a splice object having articulated joints. The splice object having articulated joints includes a plurality of first boards and a plurality of second boards. At least one of the plurality of first boards has a first adjacent edge, a first holding slot, and a first articulated arm, the first articulated arm protrudes outward from a part of the first adjacent edge, and the first holding slot is adjacent to the first articulated arm and is recessed inward from the first adjacent edge. The first articulated arm has a first longitudinal part, and a first transverse part protrudes from one lateral side of an end portion of the first longitudinal part. At least one of the plurality of second boards has a second adjacent edge, a second holding slot, and a second articulated arm, the second articulated arm protrudes outward from a part of the second adjacent edge, and the second holding slot is adjacent to the second articulated arm and is recessed inward from the second adjacent edge. The second articulated arm has a second longitudinal part, and a second transverse part protrudes from one lateral side of an end portion of the second longitudinal part. The first adjacent edge faces the second adjacent edge to define an articulated seam, the first articulated arm is accommodated in the second holding slot, and the second articulated arm is accommodated in the first holding slot. The at least one of the plurality of first boards and the at least one of the plurality of second boards are able to be positioned at various angles relative to each other along the articulated seam, the first transverse part abuts against an inner wall surface of the second holding slot, and the second transverse part abuts against an inner wall surface of the first holding slot.

Therefore, in the board structure having articulated joints provided by the present disclosure, by the design of the holding slots and the articulated arms, additional hinge elements are not needed between two boards for forming the articulated joint that allows the two boards to be bent and positioned at various angles.

Furthermore, in the present disclosure, the splice object having articulated joints can be provided through the board structure having articulated joints, such that the plurality of boards can be spliced in a manner similar to that of three-dimensional puzzle pieces to form objects having various forms (e.g., a camera stand or a wall hook).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
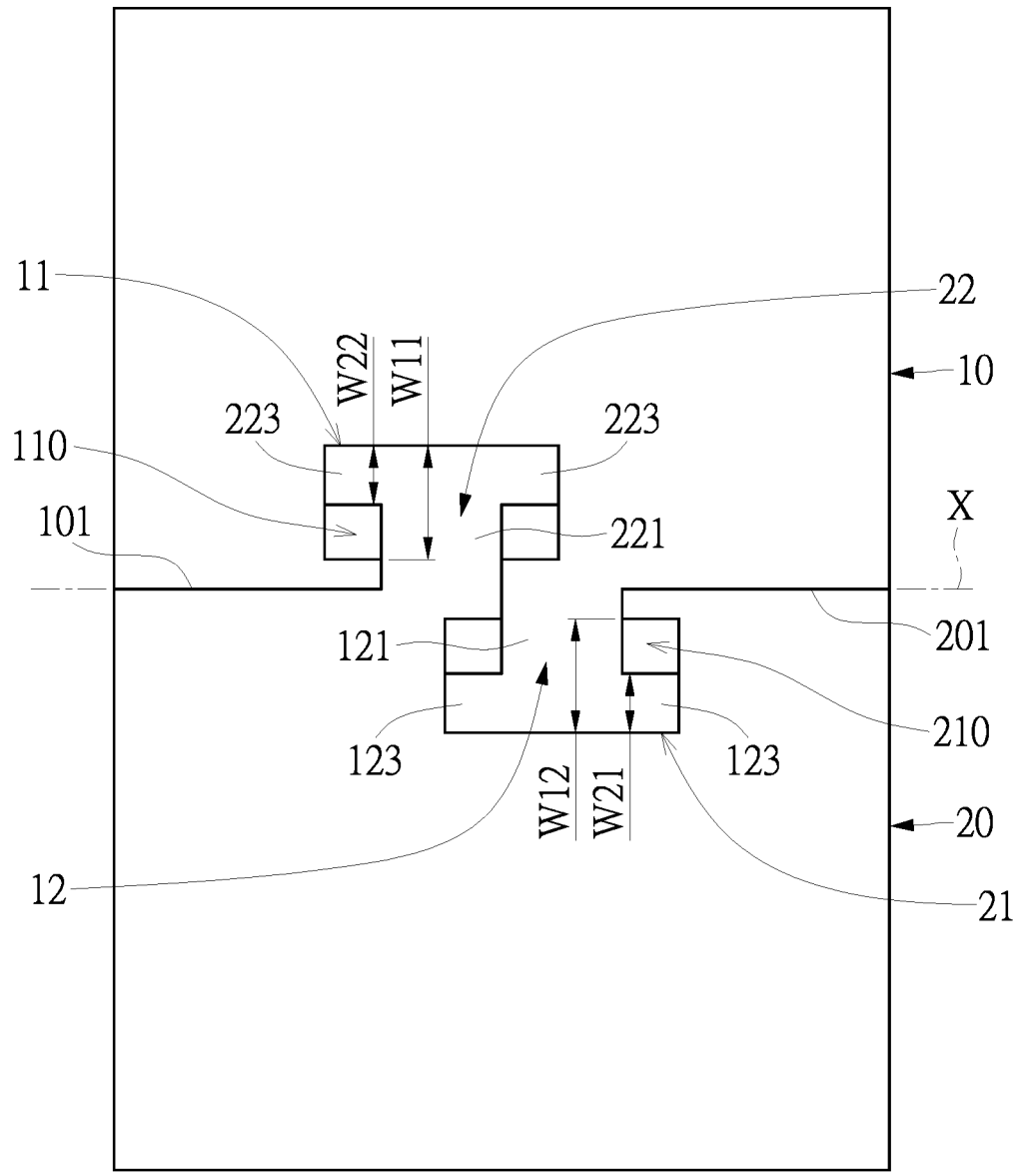
FIG. 1 is a schematic top view of a board structure having articulated joints according to a first embodiment of the present disclosure.
Figure 2:
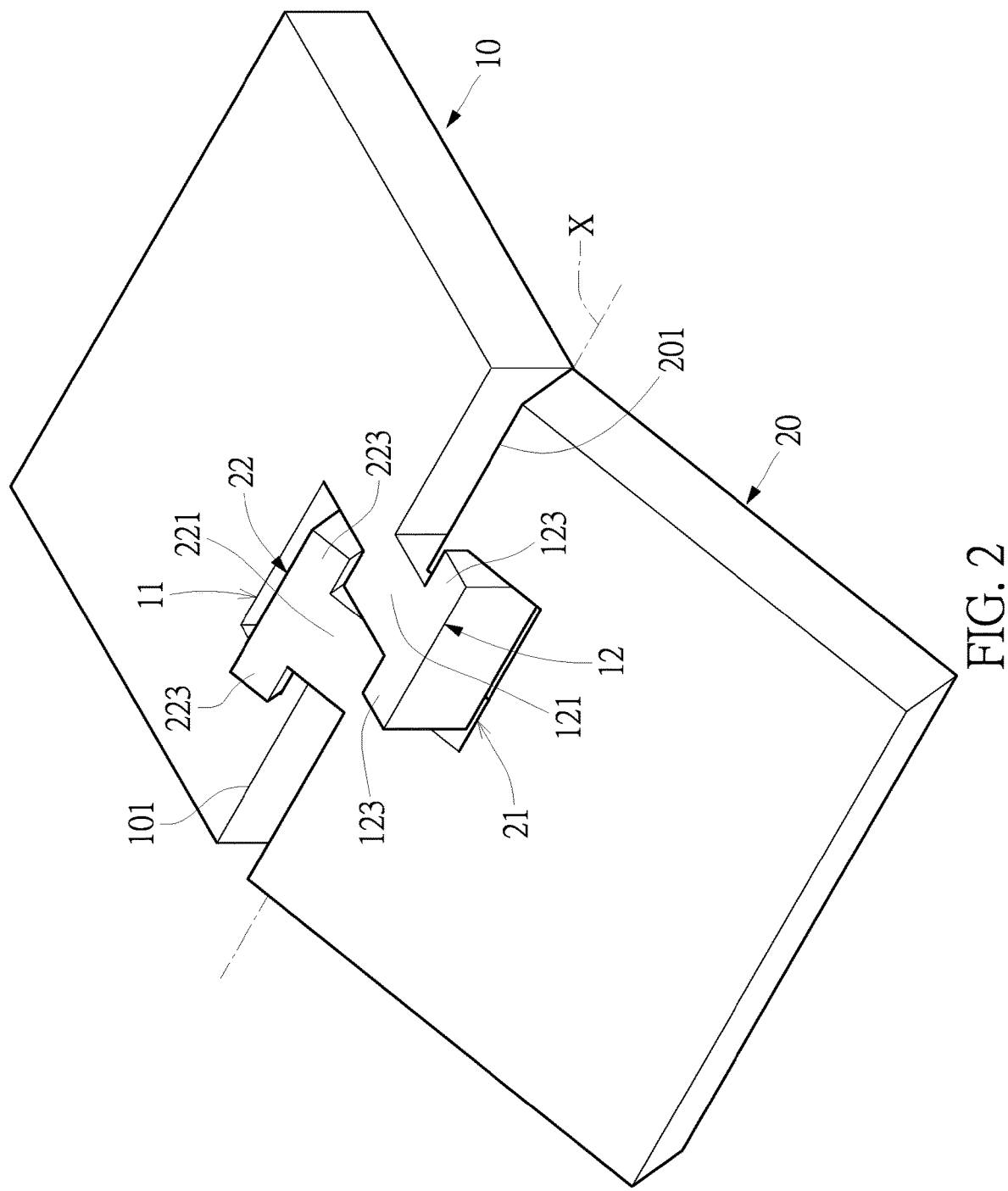
FIG. 2 is a schematic perspective view of the board structure having articulated joints and being bent according to the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure provides a board structure having articulated joints. The board structure includes a first board 10 and a second board 20. In the figures of the present disclosure, the first board 10 and the second board 20 are rectangular-shaped, but the present disclosure is not limited thereto. The material of the first board 10 and the second board 20 can be such as wood, plastic, or metal that has a certain level of rigidity and can be processed by cutting, such as laser cutting.

The first board 10 has a first adjacent edge 101, a first holding slot 11, and a first articulated arm 12. The first articulated arm 12 protrudes outward from a part of the first adjacent edge 101. The first articulated arm 12 has a first longitudinal part 121, and two first transverse parts 123 respectively protrude from two lateral sides of an end portion of the first longitudinal part 121, so that the first articulated arm 12 of this embodiment is substantially T-shaped. However, the present embodiment is not limited thereto, and a quantity of the first transverse part 123 that protrudes from the first longitudinal part 121 can be one. In other words, one first transverse part 123 protrudes from one lateral side of the end portion of the first longitudinal part 121, so that the first articulated arm 12 is substantially L-shaped. Details thereof will be described hereinafter.

The first holding slot 11 is adjacent to the first articulated arm 12 and is recessed inward from the first adjacent edge 101. The first holding slot 11 has a narrow entrance and a wide interior, such that the first holding slot 11 is substantially T-shaped. In other words, a part of the first holding slot 11 near the first adjacent edge 101 has an entrance width, and a part of the first holding slot 11 away from the first adjacent edge 101 has an inner width, and the inner width is greater than the entrance width.

The second board 20 has a second adjacent edge 201, a second holding slot 21, and a second articulated arm 22. The second articulated arm 22 protrudes outward from a part of the second adjacent edge 201. The second articulated arm 22 has a second longitudinal part 221, and two second transverse parts 223 respectively protrude from two lateral sides of an end portion of the second longitudinal part 221, so that the second articulated arm 22 of this embodiment is substantially T-shaped. However, the present embodiment is not limited thereto, and this embodiment can have only one second transverse part 223 to protrude from one lateral side of the end portion of the second longitudinal part 221, so that the second articulated arm 22 is substantially L-shaped. Details thereof will be described hereinafter.

The second holding slot 21 is adjacent to the second articulated arm 22 and is recessed inward from the second adjacent edge 201. The second holding slot 21 has a narrow entrance and a wide interior, such that the second holding slot 21 is substantially T-shaped. In other words, a part of the second holding slot 21 near the second adjacent edge 201 has an entrance width, and a part of the second holding slot 21 away from the second adjacent edge 201 has an inner width, and the inner width is greater than the entrance width.

The first adjacent edge 101 faces the second adjacent edge 201 to define an articulated seam X, the first articulated arm 12 is accommodated in the second holding slot 21, and the second articulated arm 22 is accommodated in the first holding slot 11. The articulated seam X penetrates outward and separates the first board 10 and the second board 20.

Figure 3:
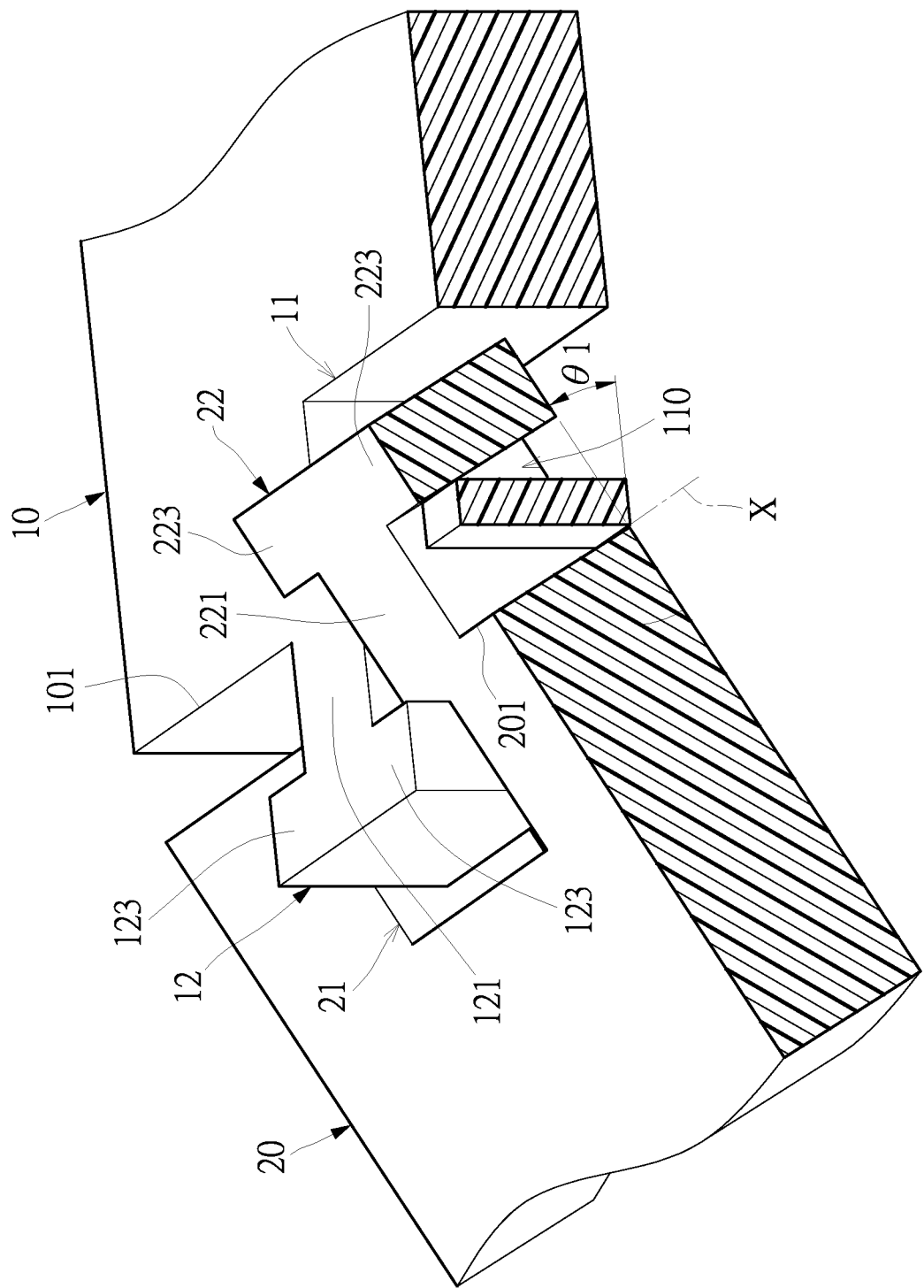
FIG. 3 is a schematic perspective cross-sectional view of FIG. 2.
Figure 4:
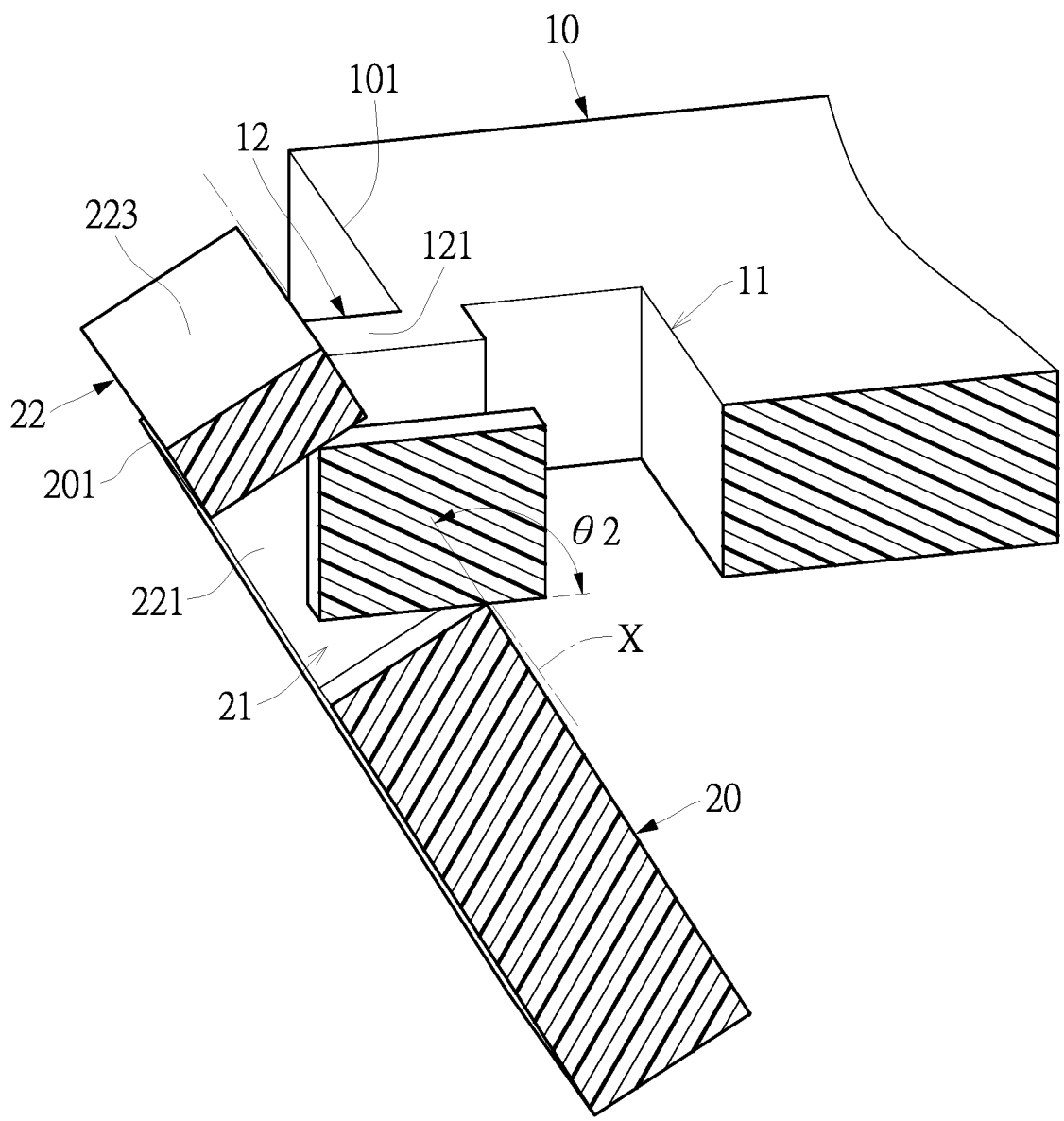
FIG. 4 is another schematic perspective view of the board structure having articulated joints and being bent according to the first embodiment of the present disclosure.

As shown in FIG. 3 and FIG. 4, the first board 10 and the second board 20 are able to be positioned at various angles relative to each other along the articulated seam X, the first transverse parts 123 abut against an inner wall surface of the second holding slot 21, and the second transverse parts 223 abut against an inner wall surface of the first holding slot 11.

In addition, as shown in FIG. 1, a width W21 of each of the first transverse parts 123 along a direction perpendicular to the first adjacent edge 101 is smaller than a width W12 of a portion of the second holding slot 21 corresponding to each of the first transverse parts 123 along a direction perpendicular to the second adjacent edge 201. That is to say, displacement spaces 210 are formed between the first transverse parts 123 and the second adjacent edge 201, such that the first transverse parts 123 can move in an arc-shaped path along the articulated seam X and within the displacement space 210. A width W22 of each of the second transverse parts 223 along the direction perpendicular to the second adjacent edge 201 is smaller than a width W11 of a portion of the first holding slot 11 corresponding to each of the second transverse parts 223 along the direction perpendicular to the first adjacent edge 101. That is to say, displacement spaces 110 are formed between the second transverse parts 223 and the first adjacent edge 101, such that the second transverse parts 223 can move in an arc-shaped path along the articulated seam X and within the displacement space 110.

As shown in FIG. 3, the second board 20 is bent at an acute angle θ1 in a clockwise direction, and the second board 20 is inclined to the first board 10 from being parallel to the first board 10. The second transverse part 223 is in an inclined position and slightly protrudes from the surface of the first board 10, and the second transverse part 223 abuts against a corner of an edge of the first holding slot 11 to generate a frictional force that allows the second board 20 to be fixed at an angle relative to the first board 10. It should be further noted that, a distance between the second transverse part 223 and the second adjacent edge 201 is preferably smaller than a thickness of the first board 10. On the other hand, the smaller the distance between the second transverse part 223 and the second adjacent edge 201 is, the smaller the acute angle θ1 is, so that the second transverse part 223 can abut against the corner of the edge of the first holding slot 11.

As shown in FIG. 4, the second board 20 is bent at a blunt angle θ2 in a clockwise direction, causing the second board 20 and the first board 10 that are originally in a state of being parallel to each other to form a sharp shape. Accordingly, the board structure having articulated joints of the present disclosure can provide an articulated structure between two boards without the need for additional components, and the two boards can be bent at a specific angle to be positioned. In addition, the board structure of the present disclosure can be applied to the connection of multiple boards for bending the boards into various shapes.

Second Embodiment

Figure 5:
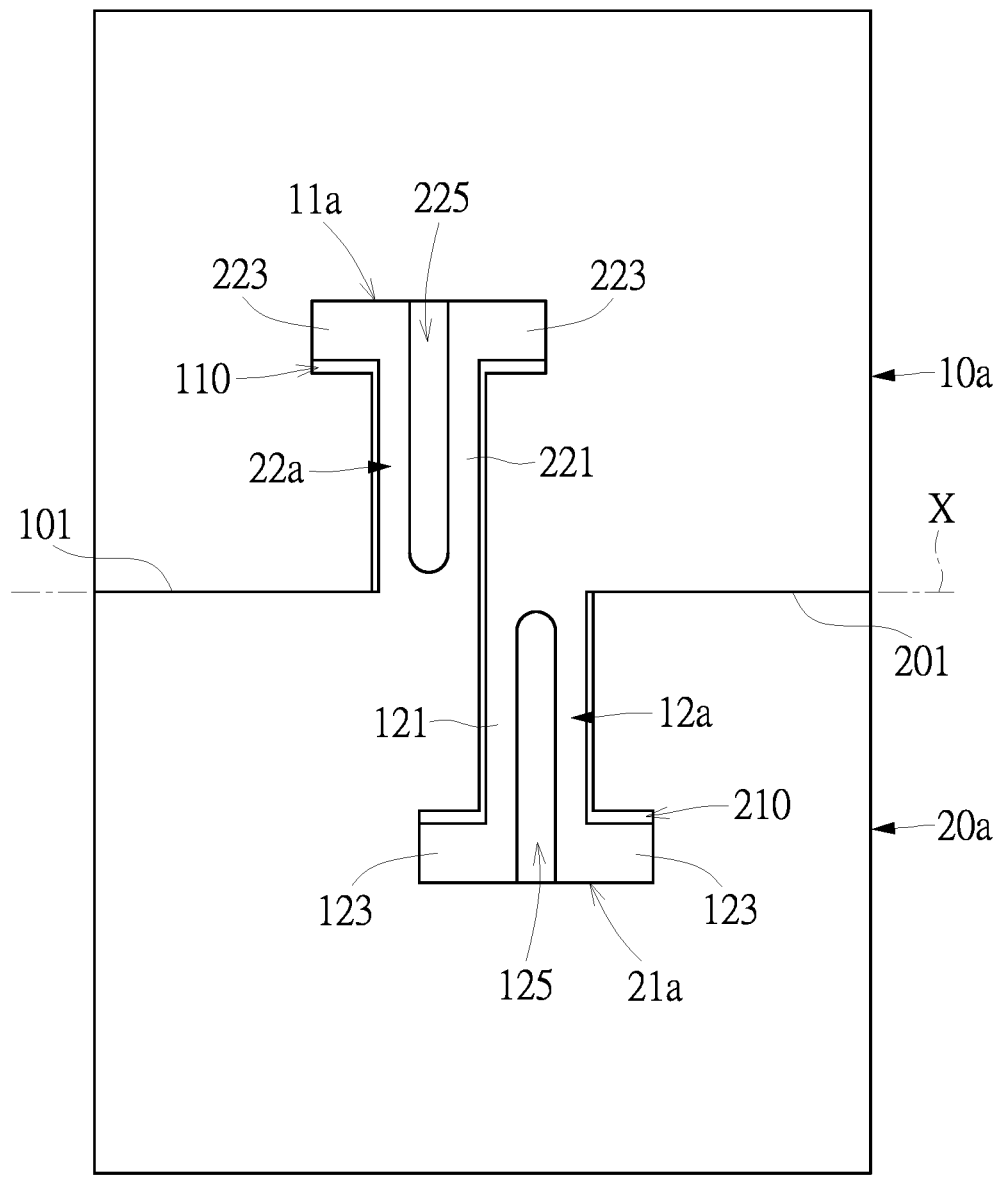
FIG. 5 is a schematic top view of the board structure having articulated joints according to a second embodiment of the present disclosure.

As shown in FIG. 5, one of the differences between the present embodiment and the previous embodiment is that, a first longitudinal part 121 of a first articulated arm 12a has a first compressible seam 125 formed along a longitudinal length of the first longitudinal part 121, one end of the first compressible seam 125 is adjacent to the first adjacent edge 101, and another end of the first compressible seam 125 penetrates a free end of the first articulated arm 12a. In addition, a second longitudinal part 221 of a second articulated arm 22a has a second compressible seam 225 formed along a longitudinal length of the second longitudinal part 221, one end of the second compressible seam 225 is adjacent to the second adjacent edge 201, and another end of the second compressible seam 225 penetrates a free end of the second articulated arm 22a.

In this embodiment, the articulated seam X penetrates outward and separates a first board 10a and a second board 20a.

The first compressible seam 125 provides a flexible space for the two first transverse parts 123 to be in close proximity to each other. On the other hand, the second compressible seam 225 provides a flexible space for the two second transverse parts 223 to be in close proximity to each other. Compared to the previous embodiment, an entrance of a first holding slot 11a (i.e., a portion of the first holding slot 11a that holds the second articulated arm 22a) is narrower and longer, and a width of a part of an interior of a first holding slot 11a that holds the second transverse parts 223 is smaller.

Figure 6:
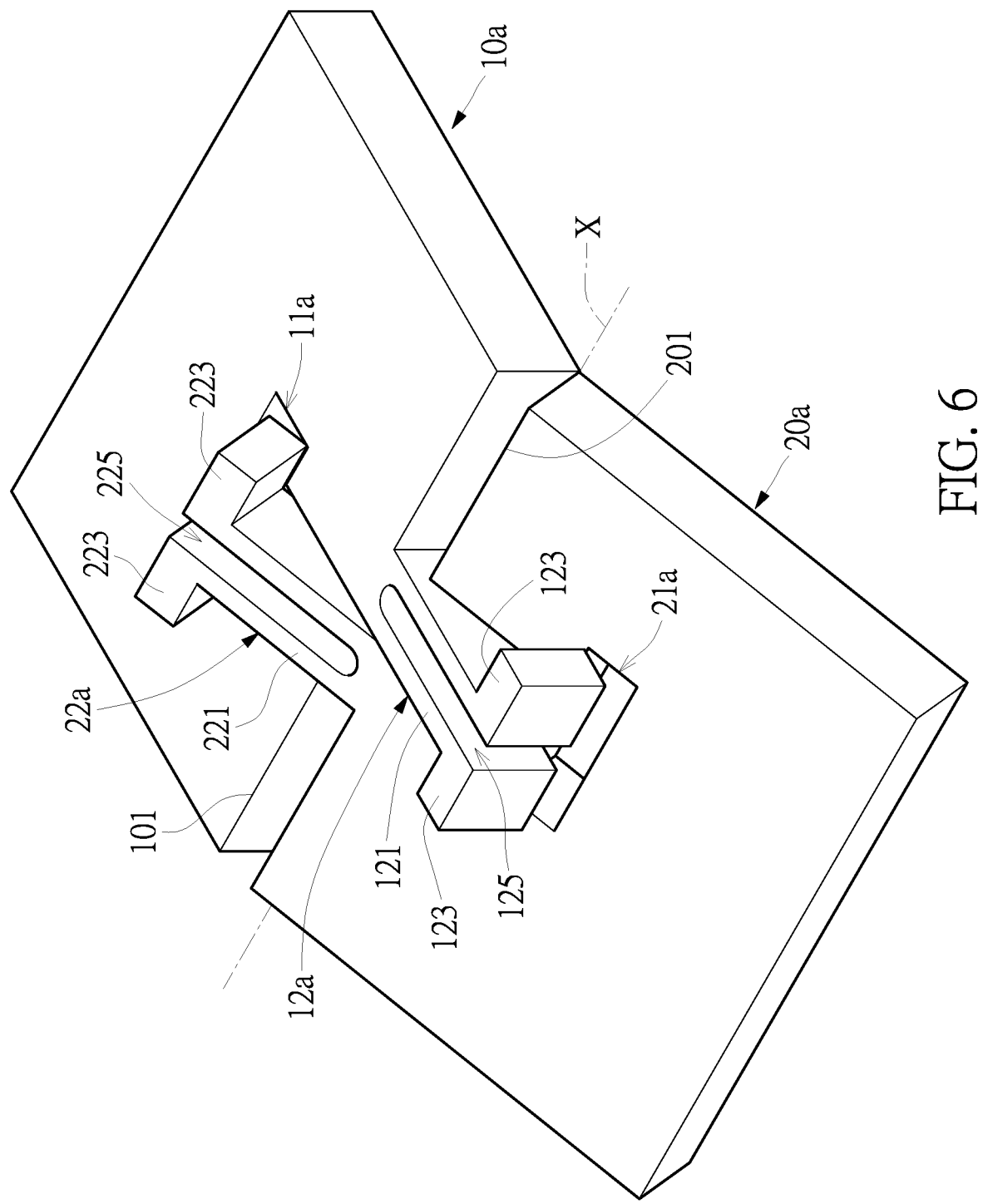
FIG. 6 is a schematic perspective view of the board structure having articulated joints and being bent according to the second embodiment of the present disclosure.
Figure 7:
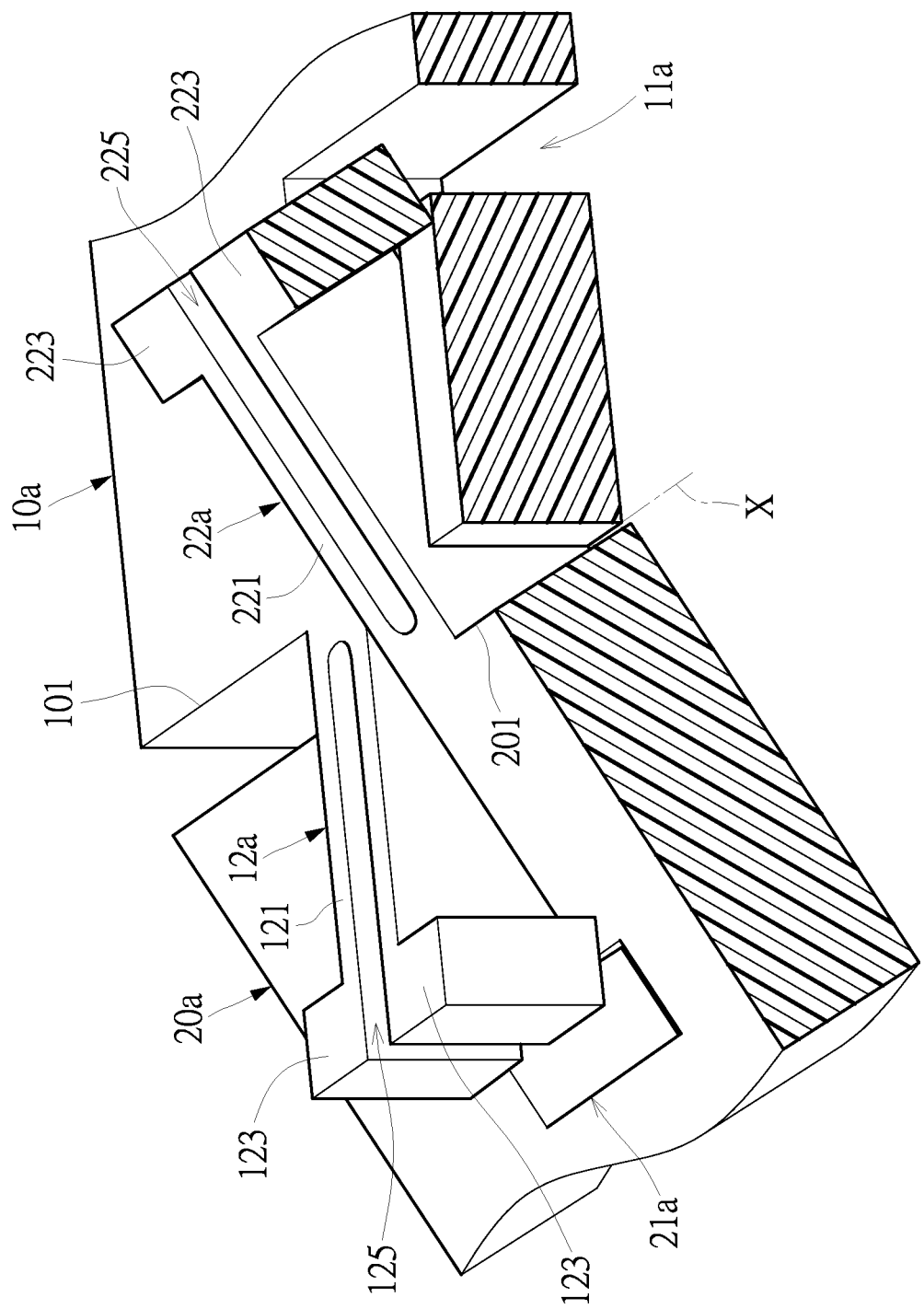
FIG. 7 is a schematic perspective cross-sectional view of FIG. 6.

As shown in FIG. 6 and FIG. 7, when the second board 20a is bent at an angle relative to the first board 10a, the second articulated arm 22a can abut against an inner wall surface of the first holding slot 11a, and the first articulated arm 12a can abut against an inner wall surface of the second holding slot 21a. In this embodiment, the two transverse parts can also be slightly tilted toward each other, so as to abut against the inner wall surfaces of the holding slots to provide more frictional force for fixing the boards.

Figure 8:
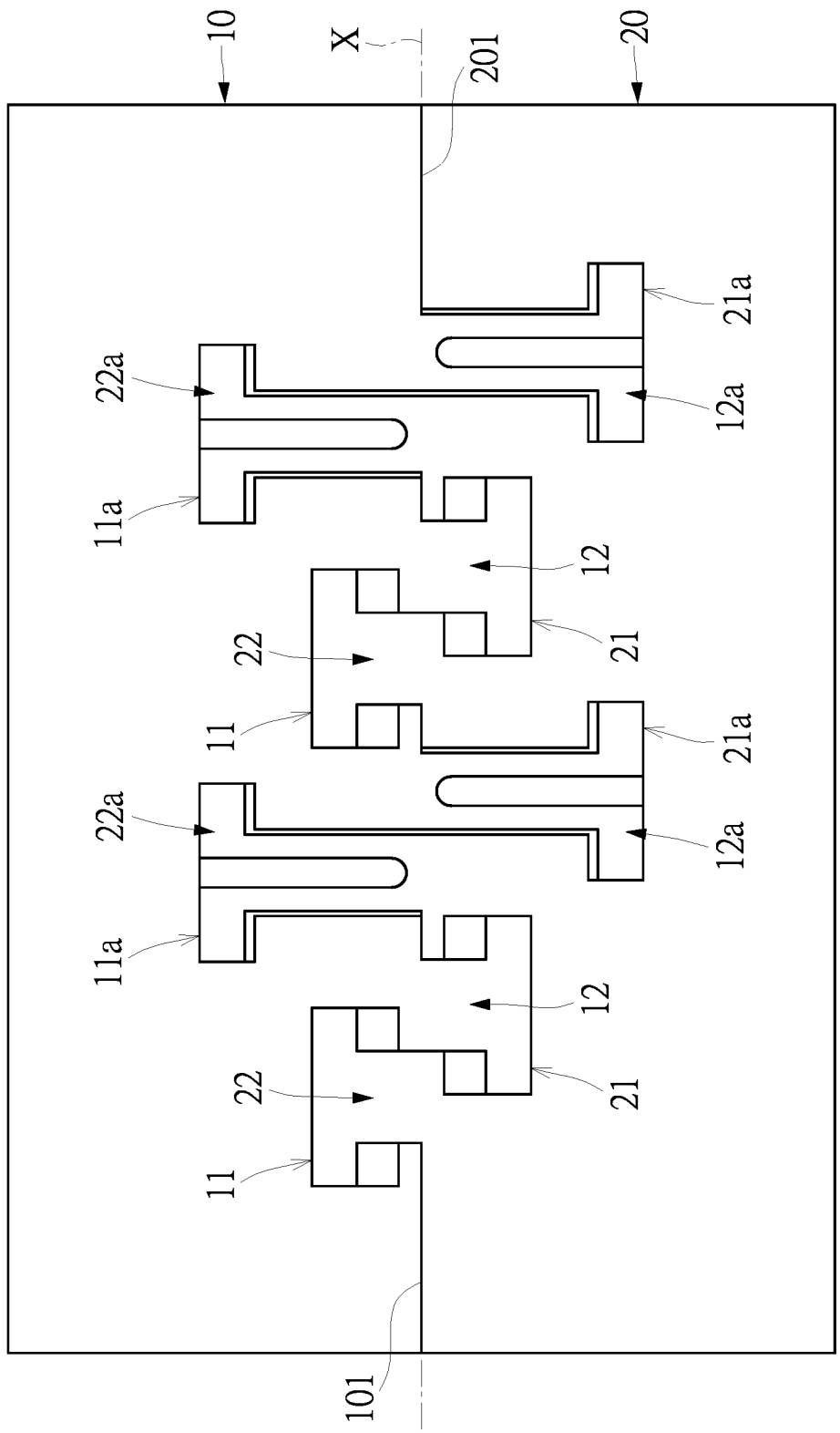
FIG. 8 is a schematic top view of the board structure having articulated joints of different embodiments being used in conjunction according to the present disclosure.
Figure 9:
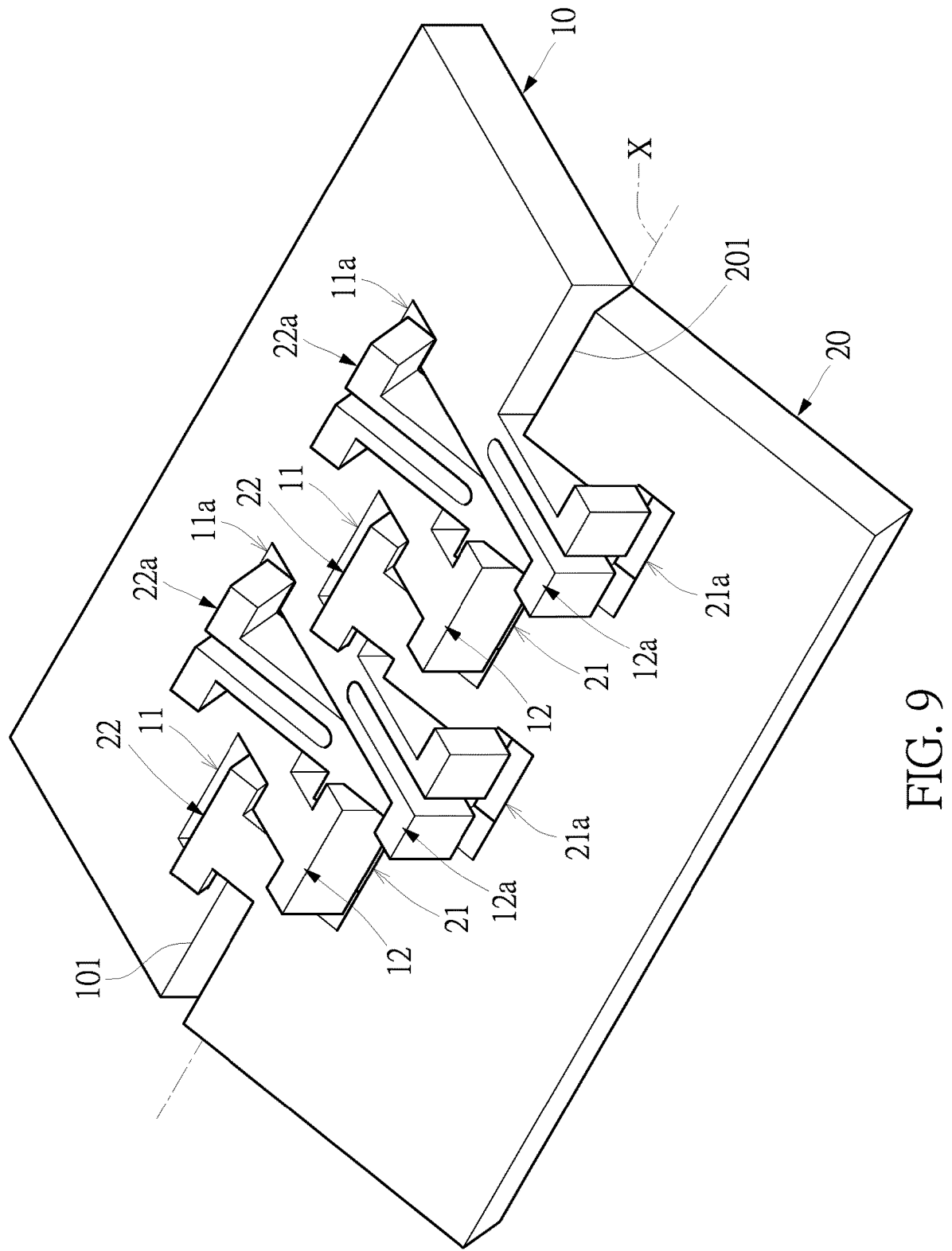
FIG. 9 is a schematic perspective view of the board structure having articulated joints of different embodiments being used in conjunction according to the present disclosure.

As shown in FIG. 8 and FIG. 9, the board structure having articulated joints of the present disclosure can form different articulated joints between the first board 10 and the second board 20. The articulated joints may include the first articulated arm 12 and the second articulated arm 22 of the first embodiment that are shorter in length, and the first articulated arm 12a and the second articulated arm 22a of the second embodiment that are longer in length. Furthermore, the first articulated arm 12 of the first embodiment can be provided between two of the first articulated arms 12a of the second embodiment, so as to save space. In addition, by the configuration of different articulated joints, different degrees of fixing force can be provided for the first board 10 and the second board 20.

Third Embodiment

Figure 10:
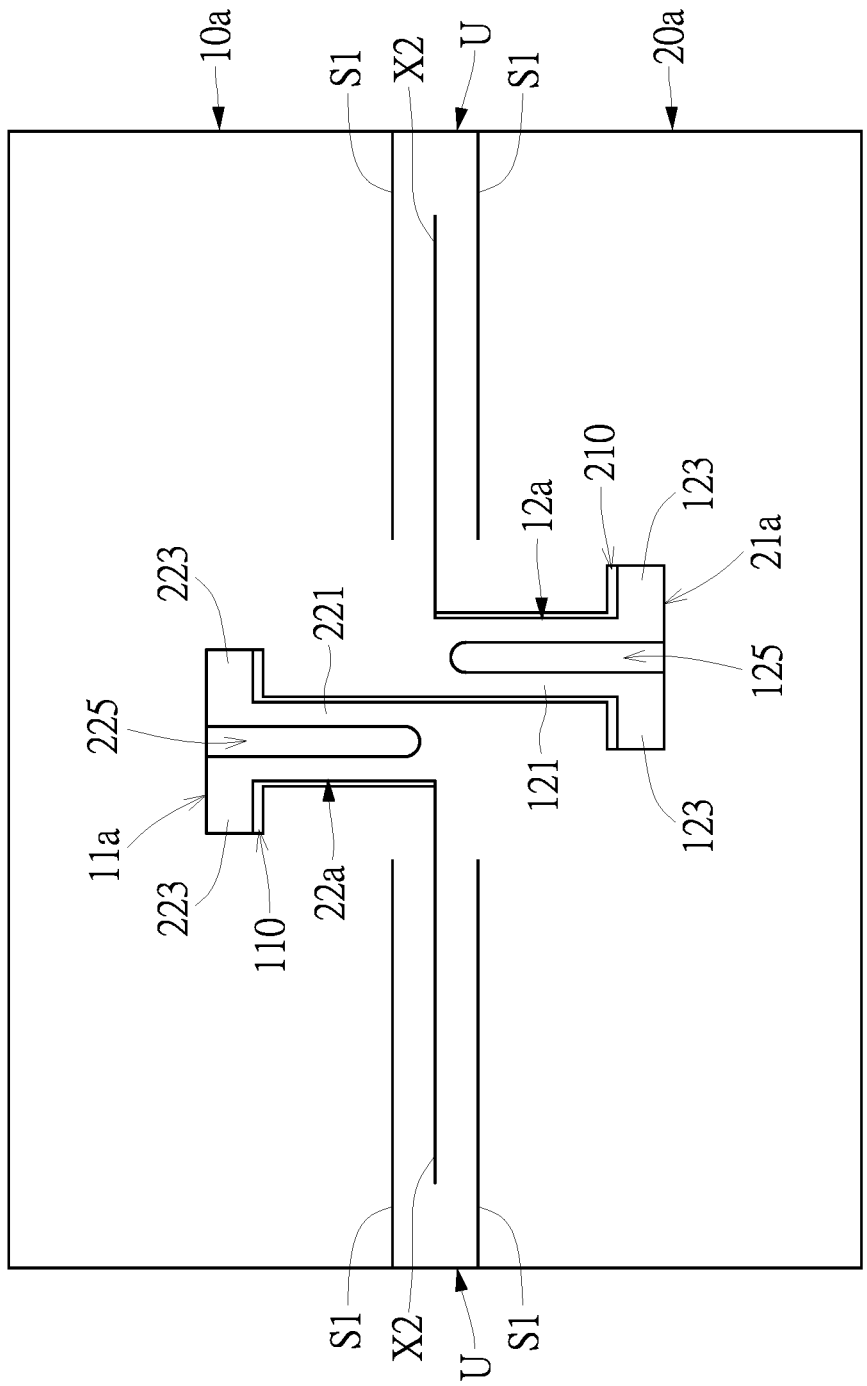
FIG. 10 is a schematic top view of the board structure having articulated joints according to a third embodiment of the present disclosure.

As shown in FIG. 10, the difference of this embodiment and the second embodiment is that, in the board structure in this embodiment of the present disclosure, an articulated seam X2 does not penetrate outward through the first board 10a and the second board 20a. That is, the first board 10a and the second board 20a are still connected. More specifically, the articulated seam X2 further has two elastic seams S1 formed on two sides thereof, respectively. The two elastic seams S1 and the articulated seam X2 form a bendable connection portion U to connect the first board 10a and the second board 20a, and the bendable connection portion U provides an elastic force for the first board 10a and the second board 20a to return to a state of being parallel to each other.

Figure 11:
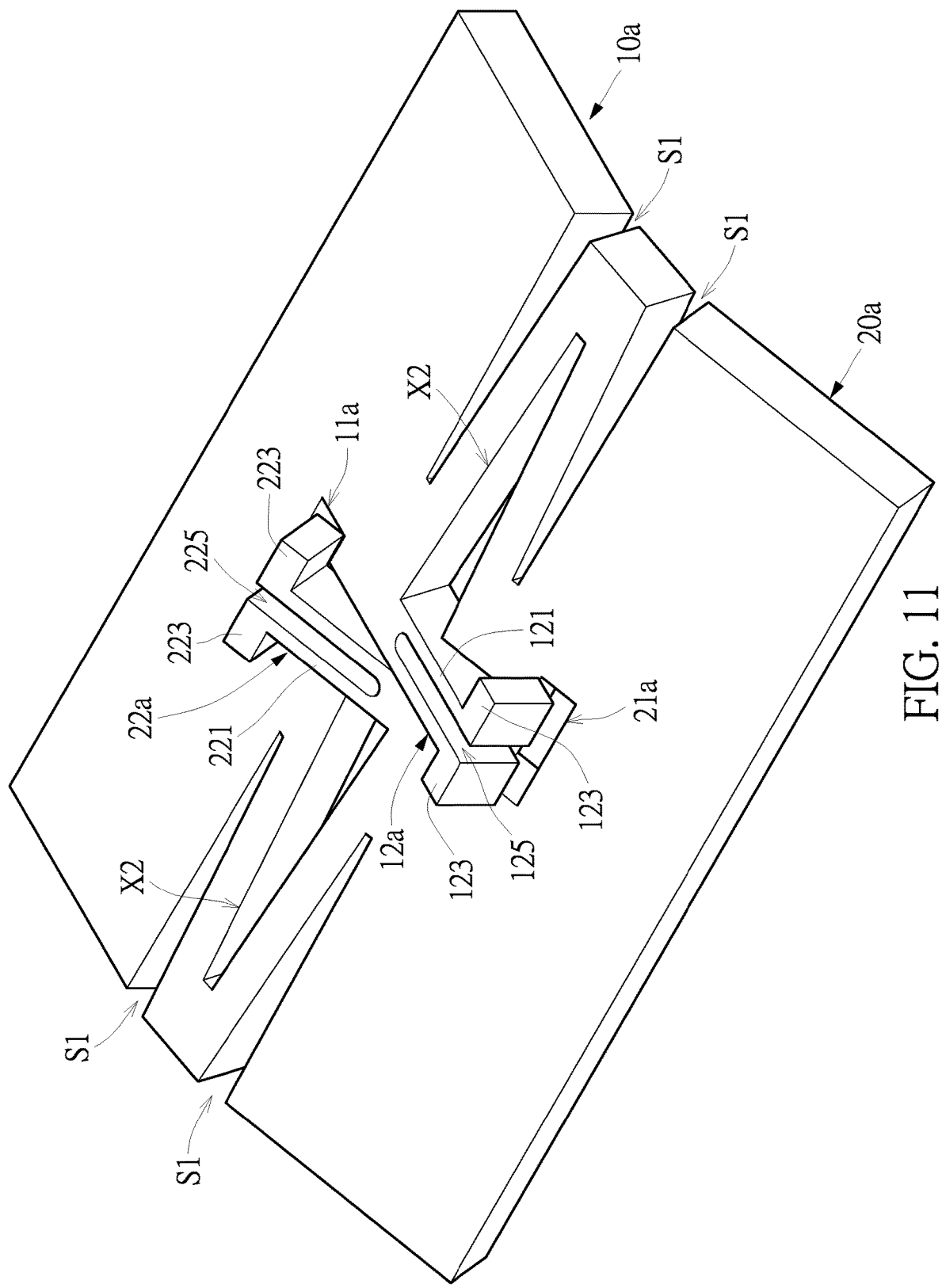
FIG. 11 is a schematic perspective view of the board structure having articulated joints and being bent according to the third embodiment of the present disclosure.

As shown in FIG. 11, when an external force is exerted on the second board 20a, the second board 20a is bent at an angle relative to the first board 10a, wherein the elastic seams S1 and the articulated seam X2 form a slightly opened V-shape. The bendable connection portion U connects the first board 10a to the second board 20a, and the bendable connection portion U is deformed to store an elastic force. As shown in FIG. 10, when the external force is removed, the bendable connection portion U provides the elastic force to return the second board 20a to a position that is parallel to the first board 10a. The present embodiment can be applied to a board structure that requires a recovery force. For example, the second board 20a can be used as a button to trigger a switch when the user presses the second board 20a (not shown in the figures). When the user does not press the second board 20a, the bendable connection portion U provides the elastic force for the second board 20a to return to an original state. This embodiment does not need additional elastic elements to provide elastic force for recovering the first board 10a and the second board 20a to their original states.

Fourth Embodiment

Figure 12:
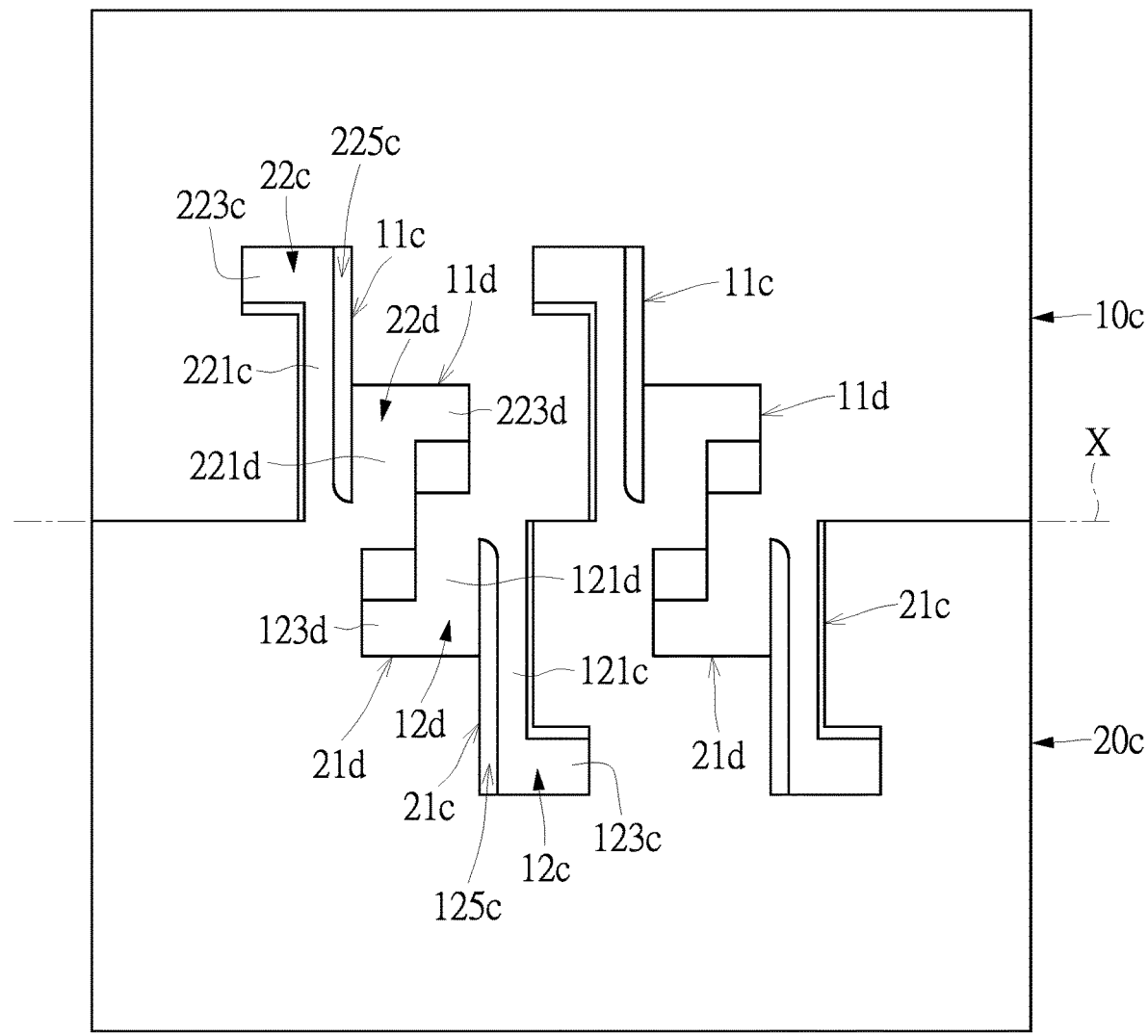
FIG. 12 is a schematic top view of the board structure having articulated joints according to a fourth embodiment of the present disclosure.

As shown in FIG. 12, the difference between this embodiment and the aforementioned embodiments is that, in the board structure in this embodiment of the present disclosure, only one transverse part is formed. In other words, the first articulated arm and the second articulated arm are substantially L-shaped, and the first holding slot and the second holding slot are also substantially L-shaped. Two first holding slots 11c, 11d that are L-shaped and adjacent to each other are formed in the first board 10c, and each of the two first holding slots 11c, 11d extends in different directions. Each of second articulated arms 22c, 22d also extends in different directions. The second articulated arm 22c has a second longitudinal part 221c and a second transverse part 223c, and a second compressible seam 225c is formed to be adjacent to a longitudinal inner wall surface of the first holding slot 11c. The second articulated arm 22d has a second longitudinal part 221d and a second transverse part 223d, and each of the second transverse part 223d and the second transverse part 223c extends in different directions.

Two second holding slots 21c, 21d that are L-shaped and adjacent to each other are formed in the second board 20c, and each of the two second holding slots 21c, 21d extends in different directions. Each of first articulated arms 12c, 12d also extends in different directions. The first articulated arm 12c has a first longitudinal part 121c and a first transverse part 123c, and a first compressible seam 125c is formed to be adjacent to a longitudinal inner wall surface of the second holding slot 21c. The first articulated arm 12d has a first longitudinal part 121d and a first transverse part 123d, and each of the first transverse part 123d and the first transverse part 123c extends in different directions. The first articulated arm 12d is opposite to the second articulated arm 22d along the articulated seam X. Generally, a fixing force between the first board 10c and the second board 20c of this embodiment is substantially half of a fixing force between the first board 10 and the second board 20 of the embodiment as shown in FIG. 8.

Figure 13:
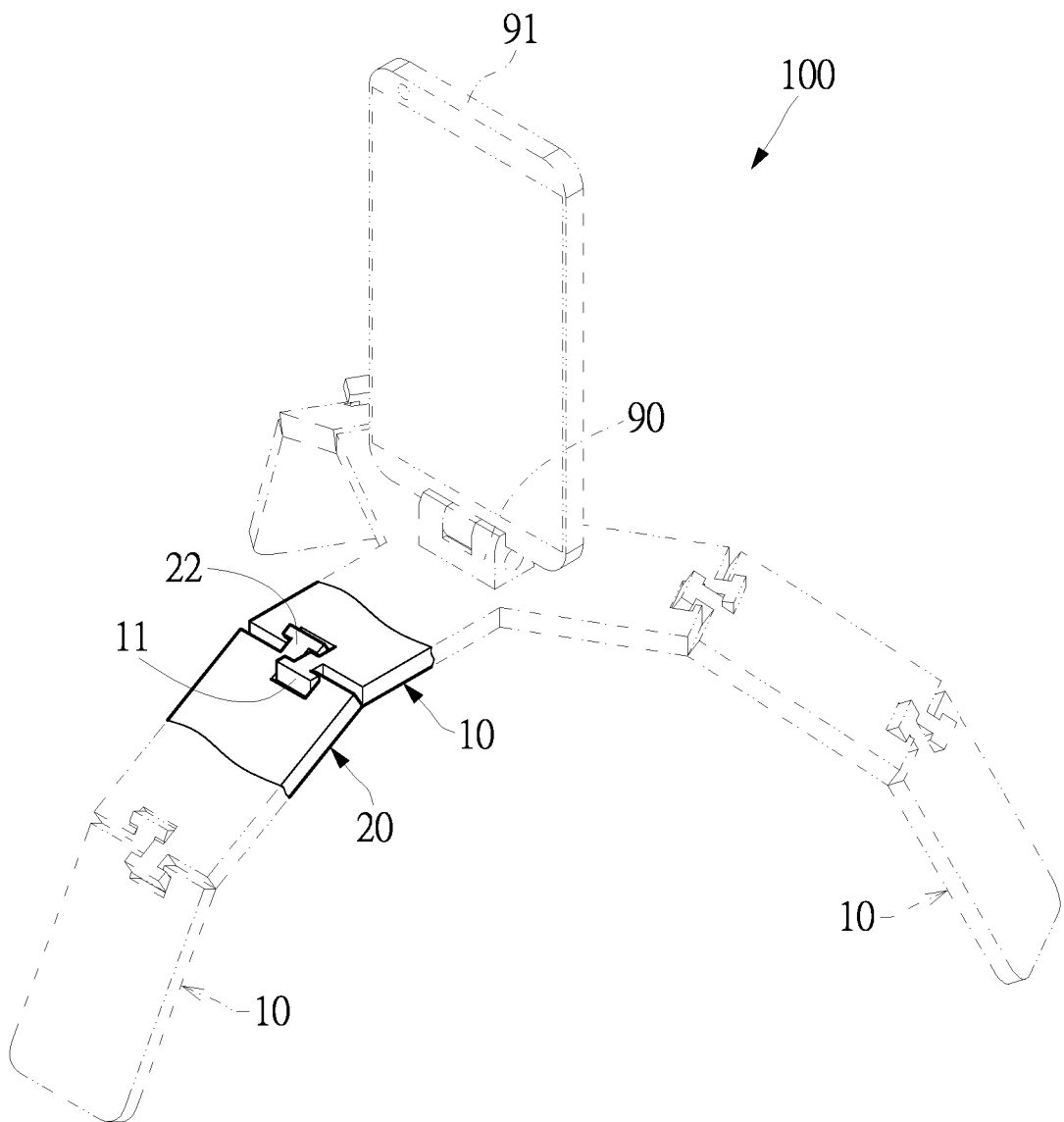
FIG. 13 is a schematic perspective view of a splice object having articulated joints according to one practical application of the present disclosure.

As shown in FIG. 13, the board structure having articulated joints of the present disclosure can be applied to a splice object 100 having articulated joints. The splice object 100 is shaped similar to a camera stand and is formed by a connection of three legs. Each of the three legs includes a plurality of first boards and a plurality of second boards that are connected to each other. For example, a topmost Y-shaped board can be a first board 10 that can carry a fixing clamp 90 to hold a mobile device 91. The three adjacent edges of the first board 10 that is the topmost first board can each be connected to a second board 20 that is square-shaped, which is then outwardly connected to a first board 10 that is square-shaped. The first boards 10 and the second boards 20 are connected through the first articulated arm 12 and the second articulated arm 22, so that the three legs can be fixed in different shapes.

Figure 14:
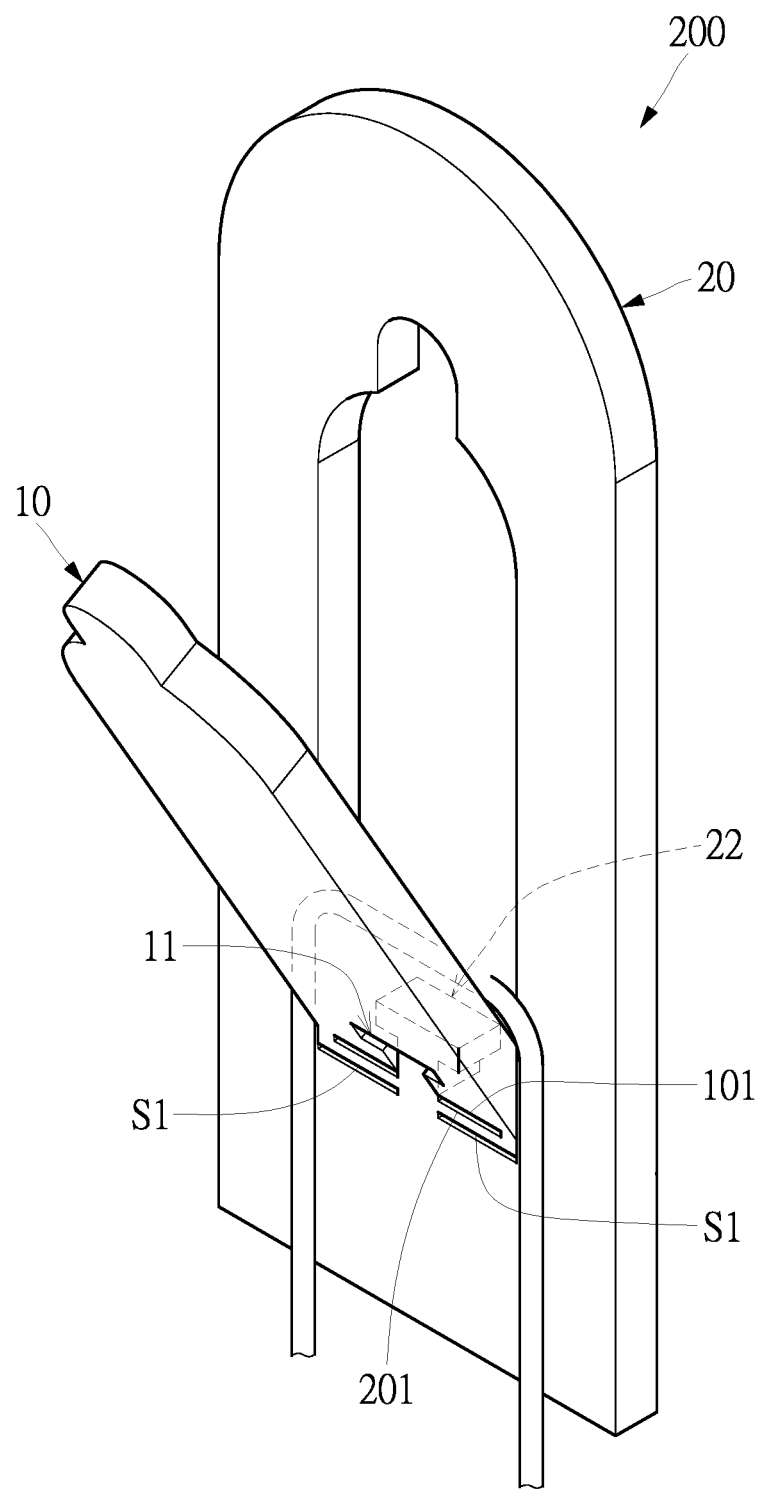
FIG. 14 is a schematic perspective view of a splice object having articulated joints according to another practical application of the present disclosure.

As shown in FIG. 14, the board structure having articulated joints of the present disclosure can be applied to a splice object 200 having articulated joints. The splice object 200 is shaped similar to a wall hook device. The second board 20 can be glued to a wall surface (not shown in the figures). The first board 10 has a first holding slot 11, and the second board 20 has a second articulated arm 22 (also called as an articulated arm, in which the articulated arm has a longitudinal part, and a transverse part protrudes from one lateral side of an end portion of the longitudinal part). A seam between the first board 10 and the second board 20 is not cut through, and the second board 20 surrounds the first board 10. An elastic seam S1 is further formed between the first board 10 and the second board 20. The first board 10 may be inclined outward at an angle relative to the second board 20 for hooking items.

Beneficial Effects of the Embodiments

In conclusion, in the board structure having articulated joints provided by the present disclosure, by the design of holding slots and articulated arms, additional hinge elements are not needed between two boards for forming the articulated joint that allows the two boards to be bent and positioned at various angles.

Furthermore, in the present disclosure, the splice object having articulated joints can be provided through the board structure having articulated joints, such that the plurality of boards can be spliced in a manner similar to that of three-dimensional puzzle pieces, so as to form objects having various forms (e.g., the camera stand as shown in FIG. 13 or the wall hook as shown in FIG. 14) such as arc-shaped objects, sphere-shaped objects, or shell-shaped objects.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A board structure having articulated joints, comprising:
   a first board having a first adjacent edge, a first holding slot, and a first articulated arm, wherein the first articulated arm protrudes outward from a part of the first adjacent edge, and the first holding slot is adjacent to the first articulated arm and is recessed inward from the first adjacent edge; wherein the first articulated arm has a first longitudinal part, and a first transverse part protrudes from one lateral side of an end portion of the first longitudinal part; and
   a second board having a second adjacent edge, a second holding slot, and a second articulated arm, wherein the second articulated arm protrudes outward from a part of the second adjacent edge, and the second holding slot is adjacent to the second articulated arm and is recessed inward from the second adjacent edge; wherein the second articulated arm has a second longitudinal part, and a second transverse part protrudes from one lateral side of an end portion of the second longitudinal part;
   wherein the first adjacent edge faces the second adjacent edge to define an articulated seam, the first articulated arm is accommodated in the second holding slot, and the second articulated arm is accommodated in the first holding slot;
   wherein the first board and the second board are able to be positioned at various angles relative to each other along the articulated seam, the first transverse part abuts against an inner wall surface of the second holding slot, and the second transverse part abuts against an inner wall surface of the first holding slot.

2. The board structure according to claim 1, wherein another first transverse part protrudes from another lateral side of the end portion of the first longitudinal part, and another second transverse part protrudes from another lateral side of the end portion of the second longitudinal part, such that the first articulated arm and the second articulated arm are T-shaped.

3. The board structure according to claim 1, wherein a width of the first transverse part along a direction perpendicular to the first adjacent edge is smaller than a width of a portion of the second holding slot corresponding to the first transverse part along a direction perpendicular to the second adjacent edge, and a width of the second transverse part along the direction perpendicular to the second adjacent edge is smaller than a width of a portion of the first holding slot corresponding to the second transverse part along the direction perpendicular to the first adjacent edge.

4. The board structure according to claim 1, wherein the first longitudinal part of the first articulated arm has a first compressible seam formed along a longitudinal length of the first longitudinal part, one end of the first compressible seam is adjacent to the first adjacent edge, and another end of the first compressible seam penetrates a free end of the first articulated arm; wherein the second longitudinal part of the second articulated arm has a second compressible seam formed along a longitudinal length of the second longitudinal part, one end of the second compressible seam is adjacent to the second adjacent edge, and another end of the second compressible seam penetrates a free end of the second articulated arm.

5. The board structure according to claim 1, wherein the articulated seam penetrates outward and separates the first board and the second board.

6. The board structure according to claim 1, wherein the articulated seam does not penetrate outward through the first board and the second board, and the articulated seam further has two elastic seams formed on two sides thereof, respectively; wherein the two elastic seams and the articulated seam form a bendable connection portion to connect the first board and the second board, and the bendable connection portion provides an elastic force for the first board and the second board to return to a state of being parallel to each other.

7. A splice object having articulated joints, comprising a plurality of first boards and a plurality of second boards;
   wherein at least one of the plurality of first boards has a first adjacent edge, a first holding slot, and a first articulated arm, the first articulated arm protrudes outward from a part of the first adjacent edge, and the first holding slot is adjacent to the first articulated arm and is recessed inward from the first adjacent edge; wherein the first articulated arm has a first longitudinal part, and a first transverse part protrudes from one lateral side of an end portion of the first longitudinal part;
   wherein at least one of the plurality of second boards has a second adjacent edge, a second holding slot, and a second articulated arm, the second articulated arm protrudes outward from a part of the second adjacent edge, and the second holding slot is adjacent to the second articulated arm and is recessed inward from the second adjacent edge; wherein the second articulated arm has a second longitudinal part, and a second transverse part protrudes from one lateral side of an end portion of the second longitudinal part;
   wherein the first adjacent edge faces the second adjacent edge to define an articulated seam, the first articulated arm is accommodated in the second holding slot, and the second articulated arm is accommodated in the first holding slot;
   wherein the at least one of the plurality of first boards and the at least one of the plurality of second boards are able to be positioned at various angles relative to each other along the articulated seam, the first transverse part abuts against an inner wall surface of the second holding slot, and the second transverse part abuts against an inner wall surface of the first holding slot.

8. The splice object according to claim 7, wherein the first articulated arm is L-shaped or T-shaped, and the second articulated arm is L-shaped or T-shaped.

9. The splice object according to claim 7, wherein the second board surrounds the first board.

10. A board structure having articulated joints, comprising:
   a first board having a first adjacent edge and a first holding slot, wherein the first holding slot is recessed inward from the first adjacent edge; and a second board having a second adjacent edge and an articulated arm, wherein the articulated arm protrudes outward from a part of the second adjacent edge, the articulated arm has a longitudinal part, and a transverse part protrudes from one lateral side of an end portion of the longitudinal part;

wherein the first adjacent edge faces the second adjacent edge to define an articulated seam, and the articulated arm is accommodated in the first holding slot;

wherein the first board and the second board are able to be positioned at various angles relative to each other along the articulated seam, and the transverse part abuts against an inner wall surface of the first holding slot.

\* \* \* \* \*